United States Patent
Anderson

(10) Patent No.: US 7,880,777 B2
(45) Date of Patent: Feb. 1, 2011

(54) METHOD FOR FIXED PATTERN NOISE REDUCTION IN INFRARED IMAGING CAMERAS

(75) Inventor: Shane M. Anderson, New Brighton, MN (US)

(73) Assignee: Fluke Corporation, Everett, WA (US)

(*) Notice: Subject to any disclaimer, the term of this patent is extended or adjusted under 35 U.S.C. 154(b) by 1043 days.

(21) Appl. No.: 11/440,754

(22) Filed: May 25, 2006

(65) Prior Publication Data

US 2006/0279632 A1    Dec. 14, 2006

Related U.S. Application Data

(60) Provisional application No. 60/685,010, filed on May 26, 2005.

(51) Int. Cl.
H04N 5/217    (2006.01)

(52) U.S. Cl. ...................................... 348/241; 348/164

(58) Field of Classification Search ......... 348/241–255, 348/164
See application file for complete search history.

(56) References Cited

U.S. PATENT DOCUMENTS

| | | | |
|---|---|---|---|
| 5,021,663 A | | 6/1991 | Hornbeck |
| 5,286,976 A | | 2/1994 | Cole |
| 5,300,915 A | | 4/1994 | Higashi et al. |
| 5,420,419 A | | 5/1995 | Wood |
| 6,023,061 A | | 2/2000 | Bodkin |
| 6,414,294 B1 | * | 7/2002 | Marshall et al. .......... 250/208.1 |
| 6,444,983 B1 | | 9/2002 | McManus et al. |
| 6,465,784 B1 | | 10/2002 | Kimata |
| 6,465,785 B1 | | 10/2002 | McManus |
| 6,538,250 B2 | | 3/2003 | McManus et al. |
| 6,552,319 B2 | * | 4/2003 | Pyyhtia et al. ........... 250/208.1 |
| 6,690,013 B2 | * | 2/2004 | McManus ................ 250/338.1 |
| 6,897,446 B2 | * | 5/2005 | Chen et al. .................. 250/330 |
| 2003/0198400 A1 | * | 10/2003 | Alderson et al. ............ 382/274 |

FOREIGN PATENT DOCUMENTS

| | | |
|---|---|---|
| EP | 0653882 A1 | 5/1995 |
| WO | 9009076 | 8/1990 |

OTHER PUBLICATIONS

Harris et al., "Nonuniformity Correction of Infrared Image Sequences Using the Constant-Statistics Constraint", IEEE Transactions on Image Processing, vol. 8, No. 8, pp. 1148-1151, Aug. 1999.
Shi et al., "A Feasible Approach For Nonuniformity Correction in IRFPA with Nonlinear Response", Infrared Physics & Technology 46 (2005), pp. 329-337.
Tzimopoulou et al., "Scene Based Techniques For Nonuniformity Correction Of Infrared Focal Plane Arrays", Part of the SPIE Conference on Infrared Technology and Applications XXIV, San Diego, CA, Jul. 1998, pp. 172-183, SPIE vol. 3436, 0277-786X/98, XP-002515542.

* cited by examiner

Primary Examiner—Sinh Tran
Assistant Examiner—Anthony J Daniels
(74) Attorney, Agent, or Firm—Fredrikson & Byron, P.A.

(57) ABSTRACT

Methods and systems for correcting fixed pattern noise (FPN) in infrared (IR) imaging cameras. The methods and systems include correcting IR sensor data different strength levels of FPN data and selecting the particular strength level that produces corrected data with the least amount of FPN. The correction may occur over several frames of IR sensor data in order to find an optimal strength level for correction.

30 Claims, 8 Drawing Sheets

METHOD FOR FIXED PATTERN NOISE REDUCTION IN INFRARED IMAGING CAMERAS

CROSS-REFERENCE TO RELATED APPLICATION

This application claims priority to U.S. Patent Application Ser. No. 60/685,010, filed May 26, 2005, entitled Method for Fixed Pattern Noise Reduction in Infrared Focal Plane Arrays, and said application is incorporated herein by reference in its entirety.

FIELD OF THE INVENTION

Embodiments of the present invention relate generally to imaging systems, such as infrared imaging cameras. More specifically, certain embodiments of the present invention are directed to methods and systems for correcting fixed pattern noise (FPN) errors in an infrared imaging camera.

BACKGROUND OF THE INVENTION

An infrared detector called the "bolometer," now well known in the art, operates on the principle that the electrical resistance of the bolometer material changes with respect to the bolometer temperature, which in turn changes in response to the quantity of absorbed incident infrared radiation. These characteristics can be exploited to measure incident infrared radiation on the bolometer by sensing the resulting change in its resistance. When used as an infrared detector, the bolometer is generally thermally isolated from its supporting substrate or surroundings to allow the absorbed incident infrared radiation to generate a temperature change in the bolometer material, and be less affected by substrate temperature.

Modern microbolometer structures were developed by the Honeywell Corporation. By way of background, certain prior art uncooled detectors and/or arrays, for example those manufactured by Honeywell, Inc., are described in U.S. Pat. Nos. 5,286,976, and 5,300,915, and 5,021,663, each of which is hereby incorporated by reference. These detectors include those uncooled microbolometer detectors which have a two-level microbridge configuration: the upper level and lower level form a cavity that sensitizes the bolometer to radiation of a particular range of wavelengths; the upper level forms a "microbridge" which includes a thermal sensing element; the lower level includes the read-out integrated circuitry and reflective material to form the cavity; the upper microbridge is supported by legs which thermally isolate the upper level from the lower level and which communicate electrical information therein and to the integrated circuitry.

A list of references related to the aforesaid structure may be found in U.S. Pat. No. 5,420,419. The aforesaid patent describes a two-dimensional array of closely spaced microbolometer detectors that are typically fabricated on a monolithic silicon substrate or integrated circuit. Commonly, each of these microbolometer detectors are fabricated on the substrate by way of what is commonly referred to as, a bridge structure which includes a temperature sensitive resistive element that is substantially thermally isolated from the substrate. This aforesaid microbolometer detector structure is often referred to as a "thermally-isolated microbolometer." The resistive element, for example may be comprised of vanadium oxide material that absorbs infrared radiation. The constructed bridge structure provides good thermal isolation between the resistive element of each microbolometer detector and the silicon substrate. An exemplary microbolometer structure may dimensionally be in the order of approximately 25 microns by 25 microns.

In contrast, a microbolometer detector that is fabricated directly on the substrate, without the bridge structure, is herein referred to as a "thermally shorted microbolometer," since the temperature of the substrate and/or package will directly affect it. Alternately, it may be regarded as a "heat sunk" pixel since it is shorted to the substrate.

"Microbolometer" is used herein to refer to both a "thermally-isolated" and a "thermally shorted" microbolometer. As used herein, a "microbolometer" refers to any bolometer type of construction in which a sensor exhibits a resistance change as a function of the observed radiation impinging thereon.

Microbolometer detector arrays may be used to sense a focal plane of incident radiation (typically infrared). Each microbolometer detector of an array may absorb any radiation incident thereon, resulting in a corresponding change in its temperature, which results in a corresponding change in its resistance. With each microbolometer functioning as a pixel, a two-dimensional image or picture representation of the incident infrared radiation may be generated by translating the changes in resistance of each microbolometer into a time-multiplexed electrical signal that can be displayed on a monitor or stored in a computer. The circuitry used to perform this translation is commonly known as the Read Out Integrated Circuit (ROIC), and is commonly fabricated as an integrated circuit on a silicon substrate. The microbolometer array may then be fabricated on top of the ROIC. The combination of the ROIC and microbolometer array is commonly known as a microbolometer infrared Focal Plane Array (FPA). Microbolometer focal plane arrays of 640.times.480 detectors are often employed within infrared cameras.

Individual microbolometers will have non-uniform responses to uniform incident infrared radiation, even when the bolometers are manufactured as part of a microbolometer FPA. This is due to small variations in the detectors' electrical and thermal properties as a result of the manufacturing process. These non-uniformities in the microbolometer response characteristics must be corrected to produce an electrical signal with adequate signal-to-noise ratio for image processing and display.

Under the conditions where a uniform electric signal bias source and incident infrared radiation are applied to an array of microbolometer detectors, differences in detector response will occur. This is commonly referred to as spatial non-uniformity, and is due to the variations in a number of critical performance characteristics of the microbolometer detectors. This is a natural result of the microbolometer fabrication process. The characteristics contributing to spatial non-uniformity include the infrared radiation absorption coefficient, resistance, temperature coefficient of resistance (TCR), heat capacity, and thermal conductivity of the individual detectors.

The magnitude of the response non-uniformity can be substantially larger than the magnitude of the actual response due to the incident infrared radiation. The resulting ROIC output signal is difficult to process, as it requires system interface electronics having a very high dynamic range. In order to achieve an output signal dominated by the level of incident infrared radiation, processing to correct for detector non-uniformity is required.

Methods for implementing an ROIC for microbolometer arrays have used an architecture wherein the resistance of each microbolometer is sensed by applying a uniform electric signal source, e.g., voltage or current sources, and a resistive load to the microbolometer element. The current resulting from the applied voltage is integrated over time by an amplifier to produce an output voltage level proportional to the value of the integrated current. The output voltage is then multiplexed to the signal acquisition system.

One source of error in microbolometer focal plane arrays is the variation in "responsivity" of each microbolometer with changes in temperature. This is because each microbolometer is a temperature sensitive resistor having a sensitivity that varies due to minute variances in the manufacturing process from one microbolometer to another. The temperature of a microbolometer is affected by the bias current flowing there through, since that current inherently warms the microbolometer due to the power dissipated. Heat is also transferred to the microbolometer through the focal plane array's substrate. Heat is also transferred to the microbolometer by infrared radiation incident on the microbolometer.

Infrared focal plane arrays (IRFPAs) such as microbolometer arrays typically exhibit pixel-to-pixel variations in responsivity and offset. These variations can contribute to persistent artifacts in the images that are known as "fixed pattern noise." Fixed pattern noise is identified by the presence of a persistent pattern or artifact that exists in the resulting imagery in a repeatable, long-term pattern. In contrast to temporal noise, fixed pattern noise persists from frame to frame for long periods. Because of this, it cannot be removed by averaging data from multiple frames.

Another factor that can contribute to fixed pattern noise is the existence of "stray" infrared (IR) radiation. The stray radiation includes any IR radiation that is incident on the pixel but that did not come from the scene of interest (i.e., that did not come from the IR energy focused on the IRFPA by the lens). Potential sources of stray IR radiation include the IRFPA's vacuum package, the barrel of the lens, the lens itself (if its emissivity is greater than zero), the camera housing and electronics, etc.

The fixed pattern noise that can occur in IR cameras can have almost any shape or appearance. For example, some sensors have exhibited fixed pattern noise that looks like a vertical stripe pattern overlaid onto the desired scene. Others have a more grid-like appearance which can be likened to looking through a screen door; i.e., you can see the scene, but there is a grid-like pattern overlaid on it. Still other sensors exhibit "spots," "blotches" or "clouds" in various areas of the image. FIGS. 1A and 1B show examples of fixed pattern noise 300 on an image, as compared to FIGS. 1C and 1D where the majority of fixed pattern noise has been removed from the image.

Typical IR camera systems apply "two-point" gain and offset corrections to correct for pixel to pixel non-uniformity and minimize fixed pattern artifacts. The offset data is obtained in "real time" by periodically actuating a shutter that is included as a part of the camera system. The gain data is effectively the inverse of the responsivity data. The gain data is generally obtained during a calibration process at the factory and is stored in nonvolatile memory on board the camera. However, the two-point correction method usually only works well when the IRFPA has relatively small pixel-to-pixel variations in responsivity and offset, and when the IRFPA is temperature stabilized. Camera systems that utilize a shutter that is located between the IRFPA and the lens (which is a common configuration) are particularly susceptible to fixed pattern artifacts caused by pixel-to-pixel variations in responsivity.

SUMMARY OF THE INVENTION

Embodiments of the present invention relate to methods of correcting FPN in IR imaging cameras. Certain embodiments include receiving a least a portion of a frame of data produced by an array of IR sensors in the camera to produce IR sensor data and correcting the IR sensor data using a selected strength level of predetermined FPN data to produce corrected IR sensor data. The selected strength level of predetermined FPN data in such embodiments is the strength level that produces reduced levels of FPN in the corrected IR sensor data.

Other embodiments of the method of the invention include receiving at least a portion of a first frame of data produced by an array of IR sensors in the camera to produce IR sensor data, correcting the IR sensor data using at least three strength levels of predetermined FPN data to produce corrected IR sensor data for each strength level, calculating an objective function value for each strength level based on the corrected IR sensor data where each objective function value is indicative of the relative level of FPN remaining in the corrected IR sensor data, and selecting the strength level that produces the lowest objective function value as the selected strength level to correct IR sensor data. Such embodiments may also include using the selected strength level as the intermediate level of the three subsequent strength levels for FPN correction of a second frame of data received subsequent to receiving the first frame of data.

DETAILED DESCRIPTION OF THE INVENTION

Figure 1B:
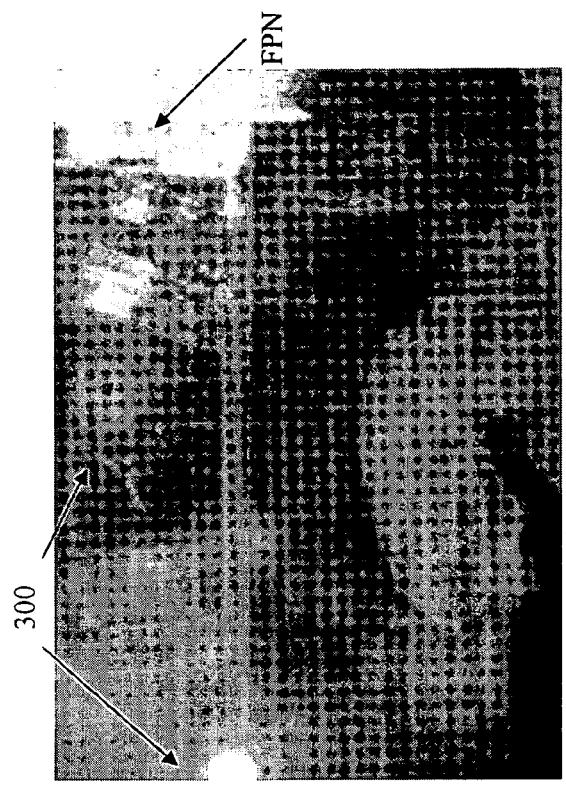
FIGS. 1A-1D show examples of infrared imagery subjected to the iterative process of embodiments of the present invention.
Figure 1D:
Figure 1A:
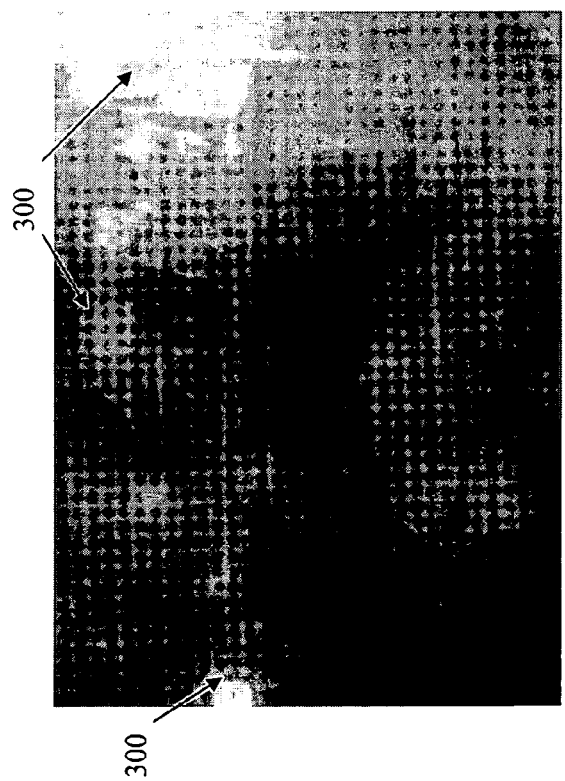
Figure 1C:
Figure 2:
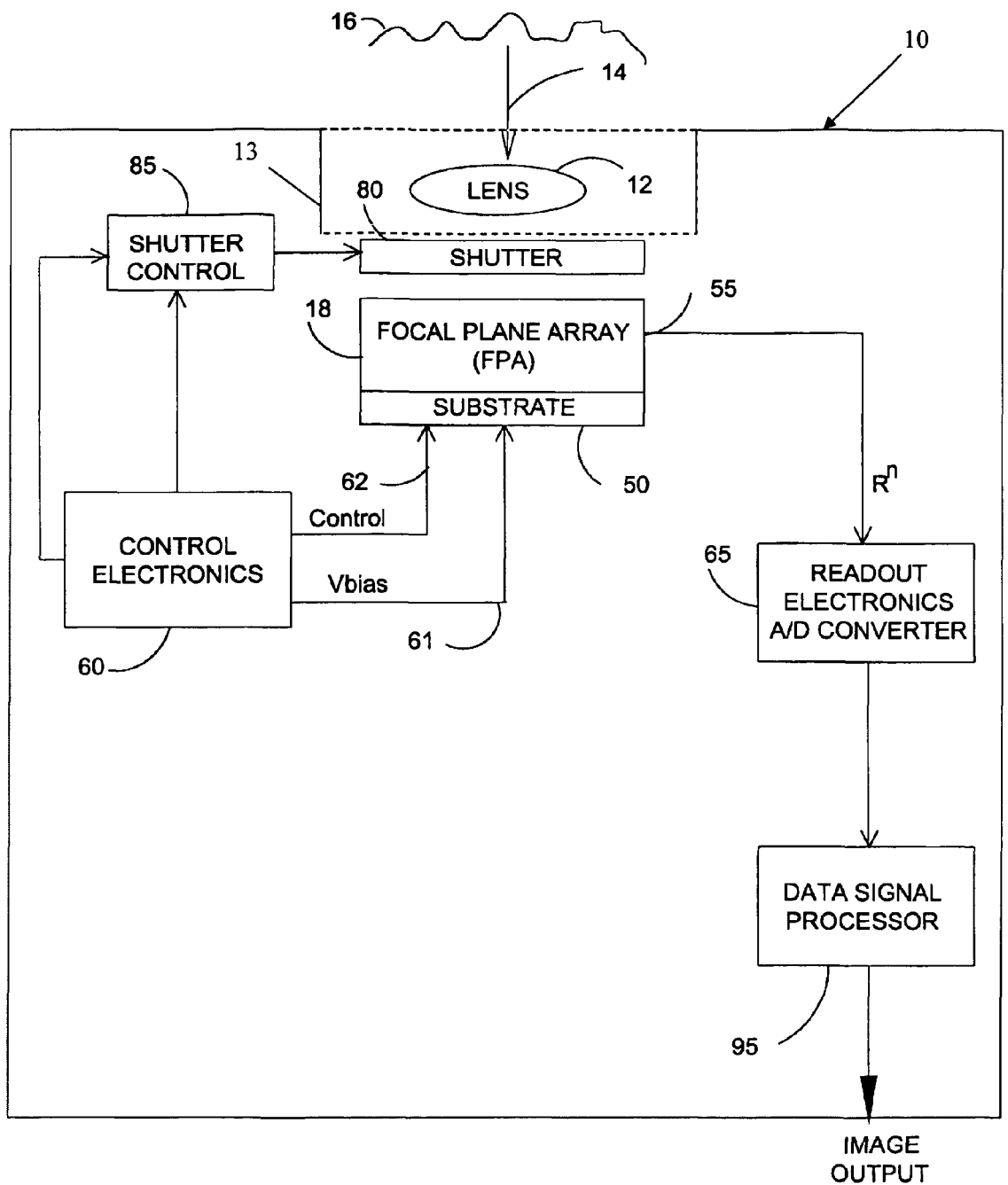
FIG. 2 is a functional block diagram of an microbolometer camera system.

FIG. 2 shows a functional block diagram of a portable camera 10 similar to that illustrated in the U.S. Pat. No. 6,023,061. A compound lens 12 (here shown as a single lens for ease of illustration) surrounded by lens barrel 13 collects infrared energy 14 from a scene 16 and images the scene onto a two-dimensional uncooled focal plane array (FPA) 18. In some embodiments, the FPA is stabilized with known TE-stabilizers. The FPA 18 is comprised of an M.times.N array of microbolometer detectors or pixels on a semiconductor substrate 50. Substrate 50 commonly may include integrated circuit architecture within the substrate for providing sensor bias and detector output multiplexing functions as desired. Each detector or pixel may be manufactured as a microbridge such as described in the aforementioned U.S. Pat. No. 5,286,976. These microbolometers are manufactured directly onto the substrate by known methods.

Control electronics 60 is coupled to the FPA 18 through one or more signal lines for applying the desired bias through a bias signal line 61 to each detector. Further, control electronics 60 further includes multiplexing functions through a control signal line 62 so that at array output 55 is an output signal representative of the resistance of a single thermally-isolated microbolometer detector R.sup.n where "n" represents one of the M.times.N array of detectors. In turn, output 55 is coupled to read-out electronics 65 for providing a digital signal representative of each detector resistance, and permits further digital signal processing, as desired, by a data signal processor 95.

As is well known in the art, offset and gain information associated with each of the detectors is obtained by a calibration technique in which the FPA is subjected to a scene of known radiation emissivity. This calibration technique is depicted in the drawing by way of controlled shutter 80 and shutter control 85 in cooperation with control electronics 60 via control signal line 81. Commonly, shutter 80 has a uniform radiation emissivity and is presented to the FPA 18 such that all of sensors view a uniform temperature scene. As such, when viewing a uniform temperature scene, a frame of data is expected to be substantially uniform, and thereby permits offset information associated with each of detectors to be derived by the data signal processor 95. The frequency of the employment of this calibration technique may be executed as desired. In some embodiments, shutter 80 and shutter control 85 may be eliminated and offset and gain information may be obtained using other known methods, such as those disclosed in U.S. Pat. Nos. 6,444,983, 6,465,785, 6,538,250, and/or 6,690,013, each assigned to the assignee of the present invention and hereby incorporated by reference in their entirety.

In operation, the camera 10 takes one frame of data corresponding to an array of data values, one from each detector, for each integration time of the FPA 18. The frames of data are common data constructs known to those skilled in the art in both cooled and uncooled arrays. As indicated before, control electronics 60 is intended to negotiate and control the flow of data between the FPA 18 and the read out electronics 65. In turn, the output of readout electronics 65 is presented to data signal processor 95 for providing offset and gain correction to the detector information as desired, as well as image data conversion for subsequent display and/or recording. Of course, associated with data signal processor 95 is data storage (not shown) for storing scene information and calibration information as desired.

Further, it should be recognized that functions provided by way of control electronics 60, shutter control 85, readout electronics 65, and data signal processor 95 may be provided by a single signal control and data processor, microprocessor, computer, or the like. Also, more or less of the aforementioned control function may be integrated as part of substrate 50. It should be recognized that in the alternative, all of the electronics may be remote from the focal plane array by way of cables, radio signals, or the like. It should also be recognized by those skilled in the art, that the aforementioned control may be implemented by way of software or firmware in order to achieve the intended functions as described here.

As previously mentioned, in order to produce a high quality image from a microbolometer focal plane array, the differences in responsivity from one pixel to another need to be taken into account, and the change in pixel resistance due to infrared radiation from the scene of interest impinging thereon must be separated from any changes due to all other sources of energy transferred to and from the pixel.

A key to solving the problem of fixed pattern noise is the predictability and repeatability of the pattern or artifact. A truly random artifact cannot be predicted and hence there can be no prior knowledge used to solve random artifacts. However, it has been observed that, for a given IRFPA and camera, the fixed pattern noise is predictable and repeatable: The same shape of artifact(s) occur(s) in the same place in the image each time the camera is used.

One of the main challenges is that even though it may be known how the pattern tends to appear in the image, it is unknown how strongly it will be present in the scene or in which polarity. In some conditions the artifact will be lighter than the image, in other cases darker. The approach described here uses an iterative search to determine how much of a particular fixed pattern is present in an image and, as this is determined, iteratively applies a correction to remove it.

An advantage of the herein described iterative approach is that it can use live data from the sensor—which includes the scene data as well as the fixed pattern source(s). Since it is unknown a priori what the actual scene is (the camera could be looking at anything), one cannot know for sure what in the scene is from the fixed pattern artifacts and what is from actual, desired scene information. However, the amount of artifact present in the image may be figured out to some extent since some prior knowledge of what the fixed pattern information will look like is available. In the embodiment shown in FIG. 2, data signal processor 95 performs the iterative process described herein used to determine this artifact presence. It is understood, however, that other electronics may instead perform the iterative process. Such electronics may be located inside the camera 10 or externally, such as in a PC or other processing device.

Figure 3:
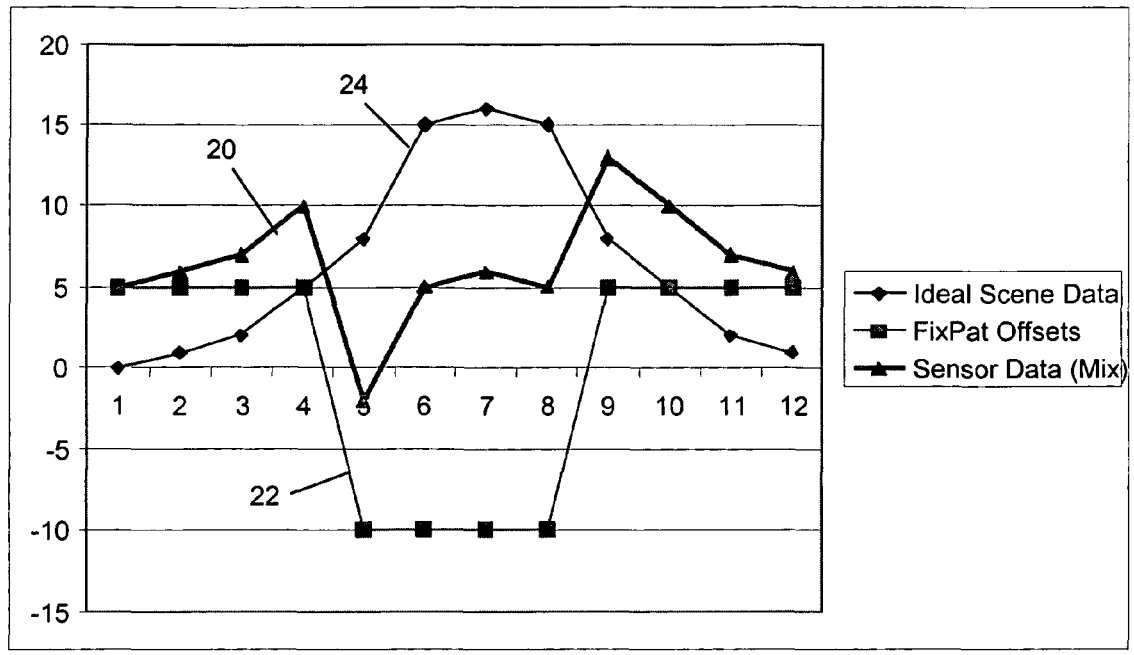
FIG. 3 is a graphical depiction of pixel sensor and noise data from a focal plane array.
Figure 10:
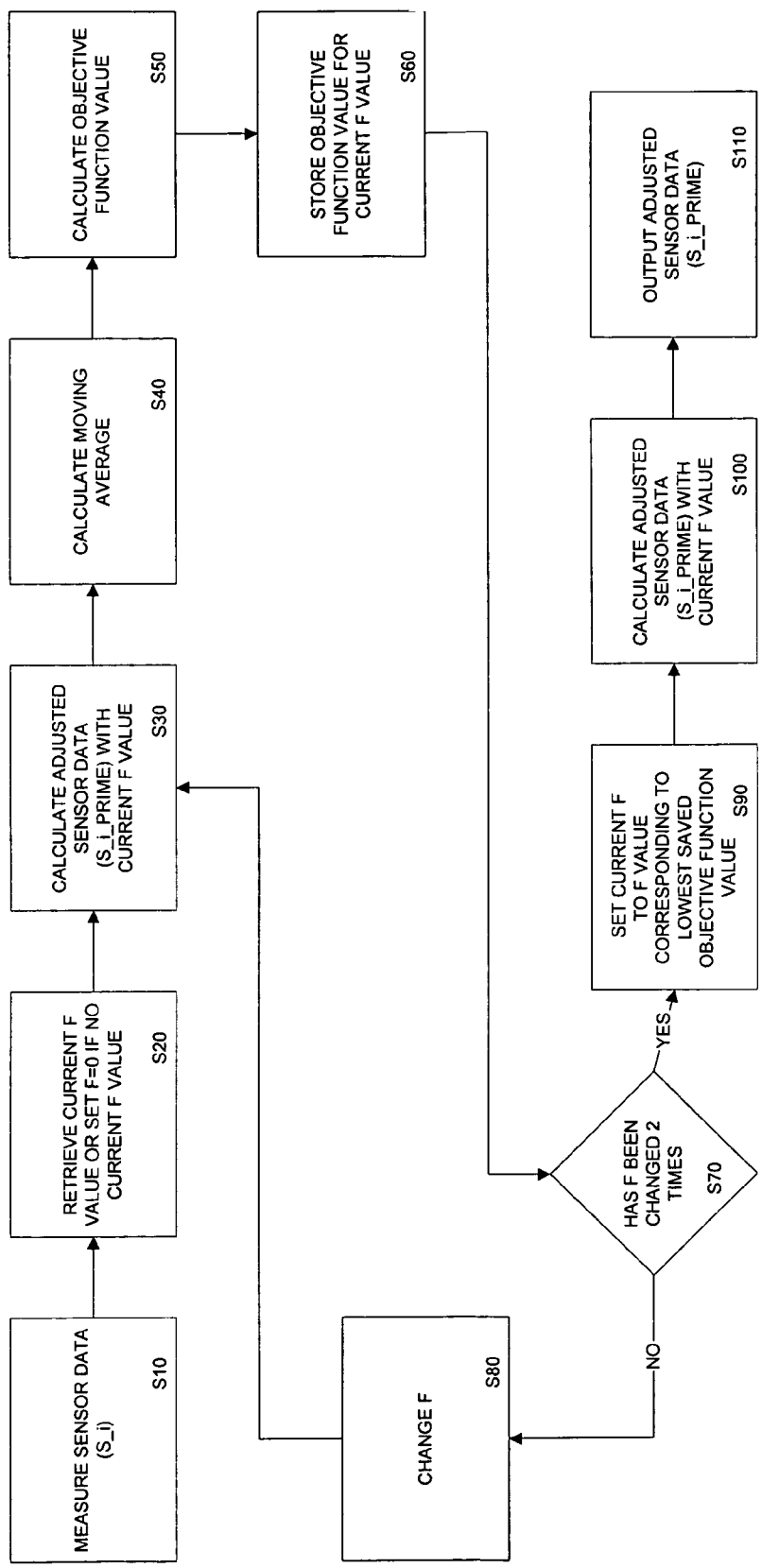
FIG. 10 is a flow chart describing the steps in an iteration in one embodiment of the present invention.

A preferred embodiment of the algorithm can be demonstrated by looking at a simplified case and by reference to steps S10-S110 in FIG. 10. For convenience, FIG. 3 shows data that can be thought of as representing one row of data collected from a two-dimensional IRFPA in step S10 (FIG. 10). Curve 20 represents the actual output for that row from the IRFPA. Curve 22 represents the general form of a potential, expected fixed pattern noise signal that we would like to remove from the image—to the degree that it occurs in the image at all. The form of the expected fixed pattern noise would have been characterized earlier, as will be described in further detail below. Curve 24 represents the ideal scene signal. This is the signal that would be expected from the sensor if there was no fixed pattern artifact at all. It has been shown simply for illustration. In the normal operating situation, this data curve 24 would not be known. The goal of the herein described iterative algorithm is to produce it from the IRFPA data curve 20 by determining the degree to which the fixed pattern artifact curve 22 is present in the data.

The correction is described by the following equation:

$$S\_i\_\text{prime} = S\_i + F * FP\_i \tag{1}$$

where S_i_prime is the corrected value for pixel "i," S_i is the raw (i.e., uncorrected) pixel value, and FP_i are the fixed pattern coefficients. The set of {FP_i} are determined in advance of step S10, as will be described below. They can be thought of as a snapshot or image of the fixed pattern artifact that is to be removed from the image. F is the optimized correction factor; i.e., the "amount" of fixed pattern correction to apply. F is determined iteratively as described below.

Next, in step S20 (FIG. 10) the current F value is retrieved that was saved in the last iteration. It is convenient to start with zero. Next, in step S30, adjusted sensor data values (S_i_prime) are calculated for the current F value. In the F=0 case, using equation (1), the (S_i_prime) values will equal the original S_i values from step S10.

Figure 4:
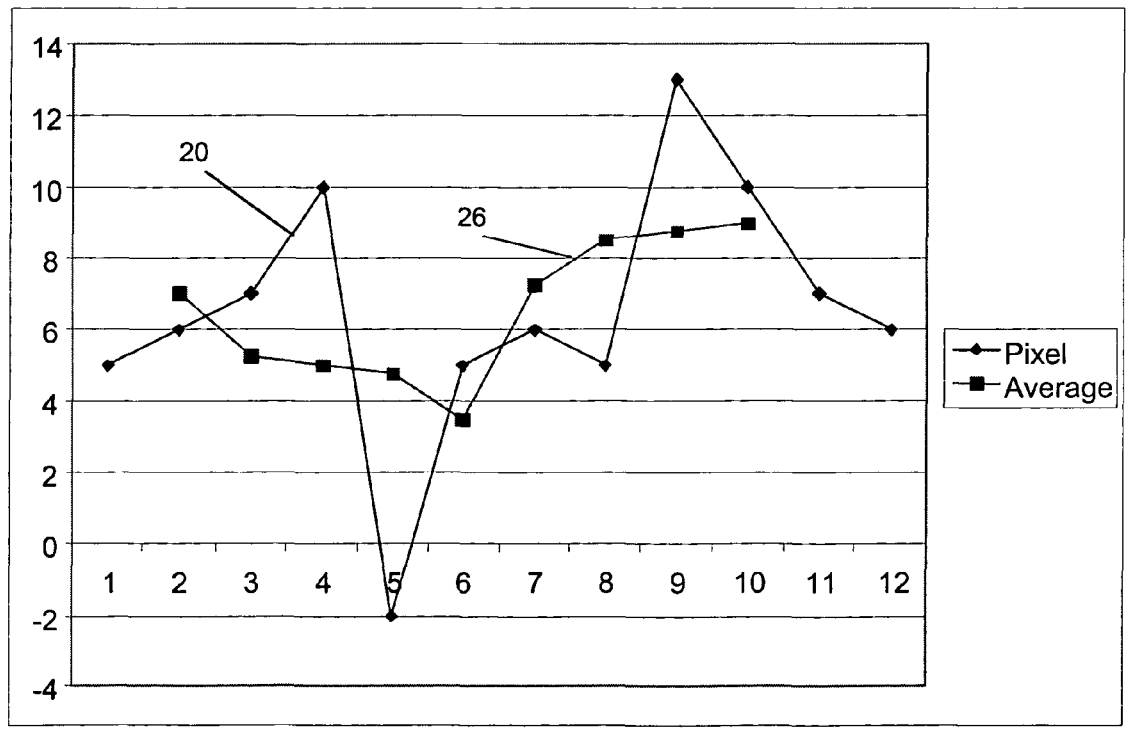
FIG. 4 is a graphical depiction of pixel sensor data and averaged data.

In step S40, a "moving" or "spatial" average of the adjusted sensor data is calculated. The averaging is essentially a smoothing step. FIG. 4 shows a four-pixel moving average curve 26 superimposed on curve 20 sensor data.

The moving average (or smoothing function) is a spatial average of pixel data which may be calculated across a row or rows of pixel data, up or down a column or columns of pixels, or over an entire frame in a focal plane array. The moving average may, for example, be calculated by taking a numerical average of the values at a certain number of neighboring pixels. The four-pixel moving average shown in FIG. 4 is computed by taking the sum of the pixel values at a preceding pixel, the current pixel, and the following two pixels and dividing by four. For example, the pixel data at the first four points in the row (or column or frame) shown in FIG. 4 have values of 5, 6, 7, and 10. The unweighted numerical average of these four values is (5+6+7+10)/4=28/4=7. As shown, the moving average has a value of 7 at the point corresponding to the second pixel. The process continues across the row until there are not enough pixels left to continue the averaging process.

It should be noted that the four-pixel moving average used in the examples is for illustrative purposes only, and that many variations of moving averages would be apparent to one of ordinary skill in the art. For example, the number of pixels used could be a number other than four, and the resultant moving average value could be assigned to a point corresponding to any of the pixels used in the average (i.e., not just the second pixel, as in the examples illustrated herein), or to another point.

In other embodiments, the moving average includes weighting functions. An example of this might be a five-pixel moving average wherein the resultant average pixel value for a given point is taken from the current pixel ($p_0$), the pixels ($p_1$), ($p_{-1}$) on adjacent sides of the current pixel ($p_0$), and from next pixel on either side ($p_2$), ($p_{-2}$). The weighting factors could be, for example, 0.1 for the two farthest pixels ($p_2$) and ($p_{-2}$), 0.2 for the next two nearer pixels ($p_1$) and ($p_{-1}$), and 0.4 for the current pixel ($p_0$). The weighted numerical average of these four values is Weighted Average=$(0.1)*(p_2)+(0.1)*(p_{-2})+(0.2)*(p_1)+(0.2)*(p_{-1})+(0.4)*(p_0)$ Numerous other schemes for calculating a weighted average may become apparent to one of ordinary skill in the art without departing from the scope of the invention described herein.

It should be further noted that the moving average (smoothing function) may be applied over a 2-dimensional frame of data, rather than to just a row or column of pixel data as indicated in FIG. 4. However, in a situation where consecutive rows of a frame are being averaged, the moving average may be designed to be discontinuous from one row to the next, since data at the far "right" end of one row should not be spatially averaged with data corresponding to the far "left" portion of an adjacent row, for example. In one possible embodiment of the invention, the moving average may be calculated using neighboring points that may include points from adjacent columns and rows, including points that may be diagonally proximate the current pixel. In certain embodiments, the pixels used to calculate an average for a particular location form a contiguous pattern with the pixel in the particular location. For example, a moving average may incorporate pixel data from a 3×3 grid of pixels surrounding and including the current pixel.

Figure 5:
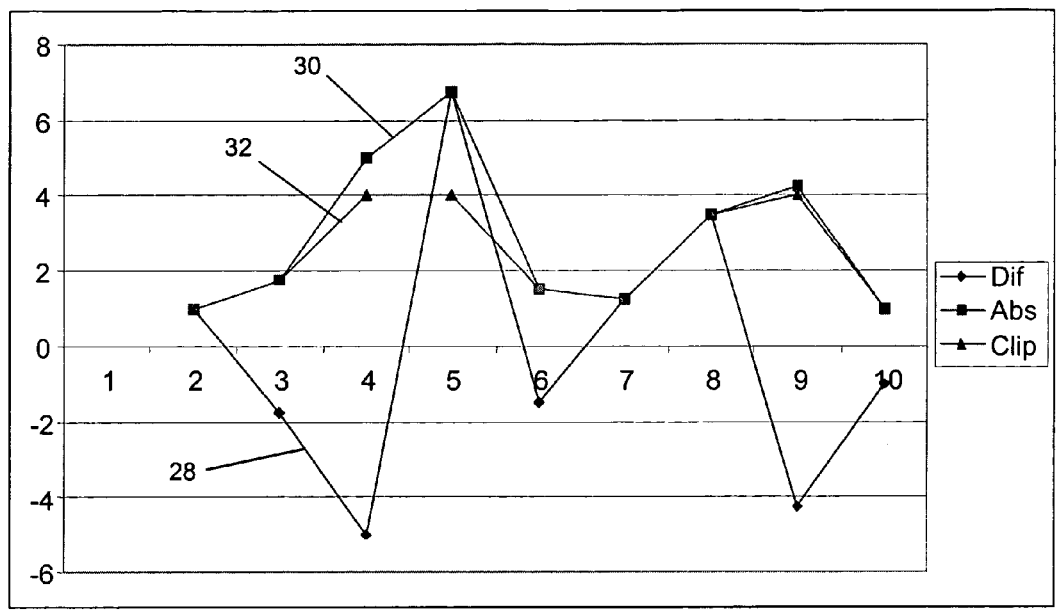
FIG. 5 is a graphical depiction of pixel sensor data processed by difference, absolute value, and clipping functions.

Next, in step S50, an objective function value is calculated. The objective function value is calculated by first subtracting the adjusted sensor data (original in this case since F=0) data from the moving average, and then taking the absolute value of the result to determine the magnitude. Then, clip these values at a certain magnitude (clipped at 4 for this example, although other magnitudes may also be used). FIG. 5 shows difference curve 28, absolute value curve 30, and clipped data curve 32. The clipping step is useful. Without the clipping step, large changes (sharp edges) in scene data that correlate with an edge in the fixed pattern may override other real fixed pattern errors and the iterative search for the best correction may fail.

Finally, to calculate the "objective" or "quality" function for the optimization, sum the clipped values up. The sum of the clipped values in the example data in curve 32 is 22. The objective function value (22 in this example) is stored for the current F value in step S60. Basically, lower numbers represent "flatter" (i.e., more uniform) sensor data. The goal of the iterative optimization is to minimize the objective function value. This is done by repeating the above procedure two more times (once with F incremented, and once with F decremented) for each iteration of the optimization process. That is, in step S70, a determination is made whether F has been changed two times after the calculation using the original F value for this iteration. As noted below, other embodiments contemplate changing F more than two times but at least once. Assuming F has not been changed two times in step S70, F is changed in step S80.

Figure 6:
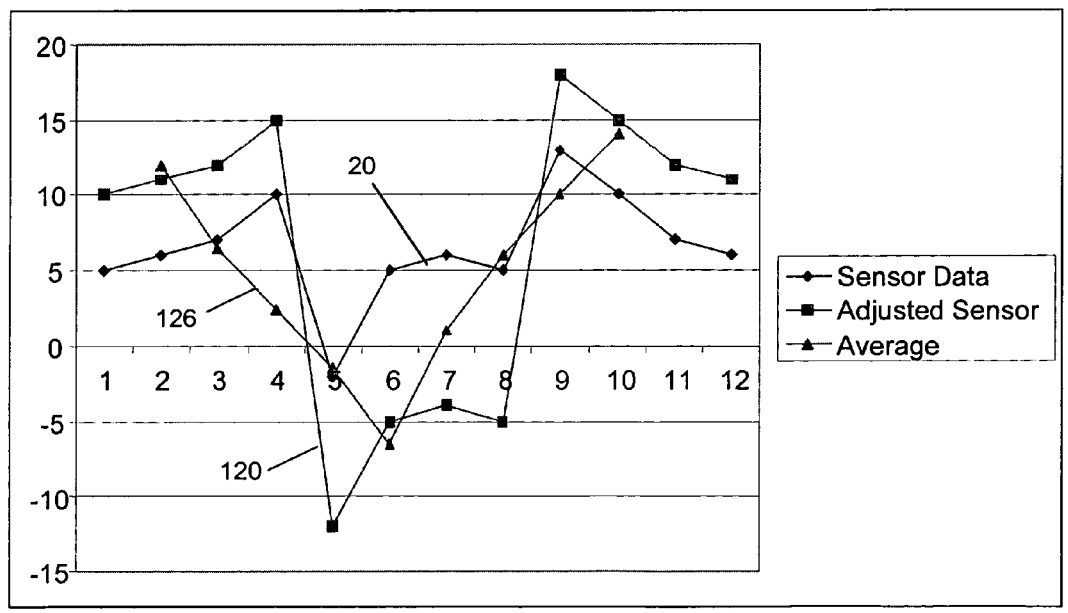
FIG. 6 is a graphical depiction of pixel sensor data, adjusted data, and averaged data.

Continuing with the example, first the up (increment) case is illustrated: In step S80, F is changed such that F current value=F+1=1. FIG. 6 shows original sensor data curve 20, adjusted (with F incremented) sensor data curve 120 (step S30), and the moving average of the adjusted data curve 126 (step S40).

Figure 7:
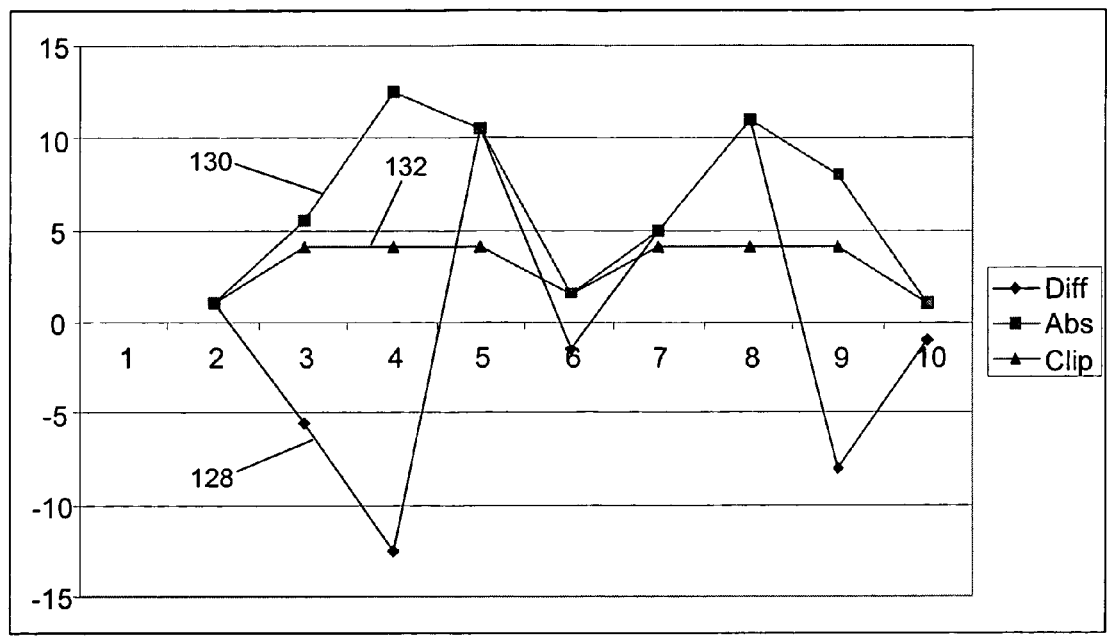
FIG. 7 is a graphical depiction of pixel sensor data processed by difference, absolute value, and clipping functions.

FIG. 6 shows that the adjusted sensor data curve 120 isn't "flatter" than the original sensor data curve 20. FIG. 7 shows the corresponding difference curve 128, absolute value curve 130, and clipped data curve 132. For the increment case, the sum of the clipped plot (i.e., the objective function) is 27.5 (step S50). This value is stored for F=1 in step S60.

Figure 8:
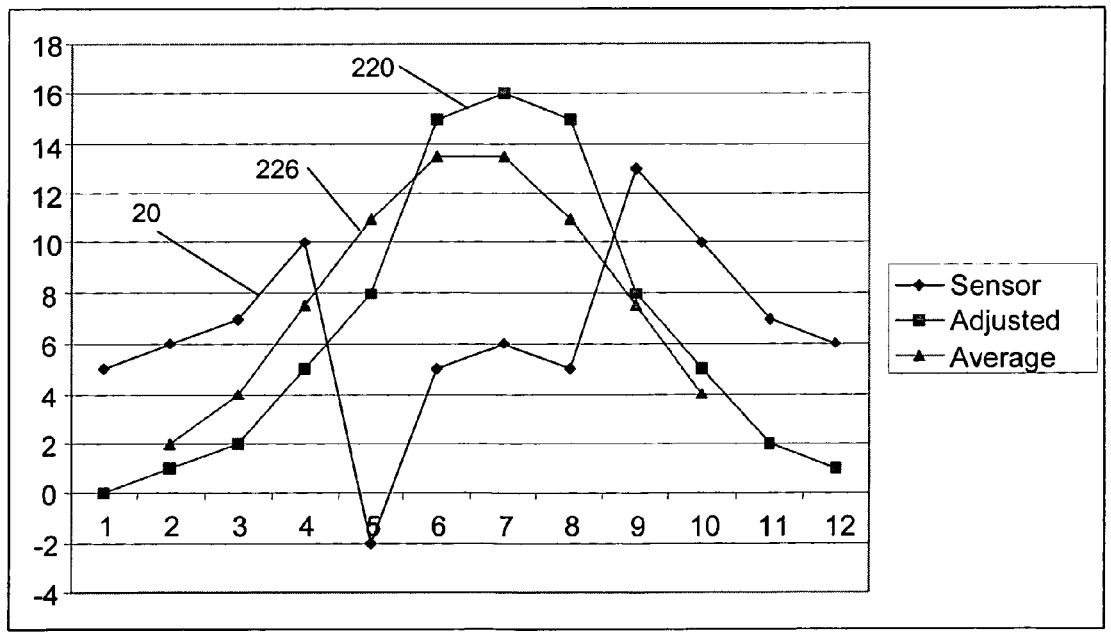
FIG. 8 is a graphical depiction of pixel sensor data, adjusted data, and averaged data.
Figure 9:
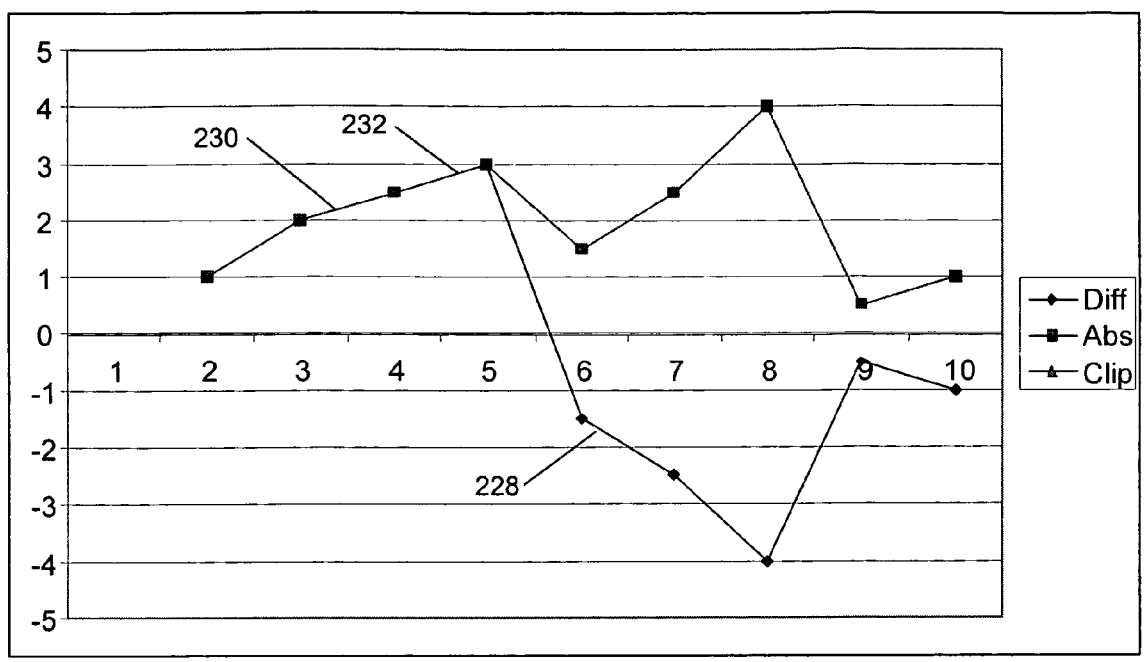
FIG. 9 is a graphical depiction of pixel sensor data processed by difference, absolute value, and clipping functions.

FIGS. 8 and 9 illustrate the "down" (decrement) case where F is changed (step S80) such that F=F−1=−1. FIG. 8 shows original sensor data curve 20, adjusted (with F decremented) sensor data curve 220 (step S30), and the moving average of the adjusted data curve 226 (step S40). FIG. 9 shows the corresponding difference curve 228, absolute value curve 230, and clipped data curve 232. For this case, the sum of the clipped values is 18 (step S50). This represents the lowest value for the objective function for each of the three quality measurements (increment, decrement and "as is"). Therefore, the new "current" value of F is assigned to this value (i.e., F=−1, the decremented value) in step S90. In step S100, the adjusted sensor data (S_i_prime) is calculated using the new current value of F determined in step S90. Alternatively, this adjusted sensor data is saved from when it was calculated in step S30.

In another alternative embodiment, the new current value of F is used to adjust sensor data obtained in the next frame (or next iteration if the iterations are rows, columns, or groups other than frames). In such an embodiment, the new current value of F is calculated based on sensor data from the current frame, but the adjustment of data using the new current value of F is made to the following frame. In essence, the adjustment lags the data by one frame. As the objective function value converges on a minimum, this lag becomes moot since, in theory, the current value of F will be generally constant from frame to frame. This lagging feature is useful when processing speed limitations render it difficult to determine F and apply it to the same frame of data.

The frame of adjusted sensor data is then output for display and/or storage of the adjusted image. Through this process, the fixed pattern noise is removed from the sensor data before it is output for display or storage.

Figure 11:
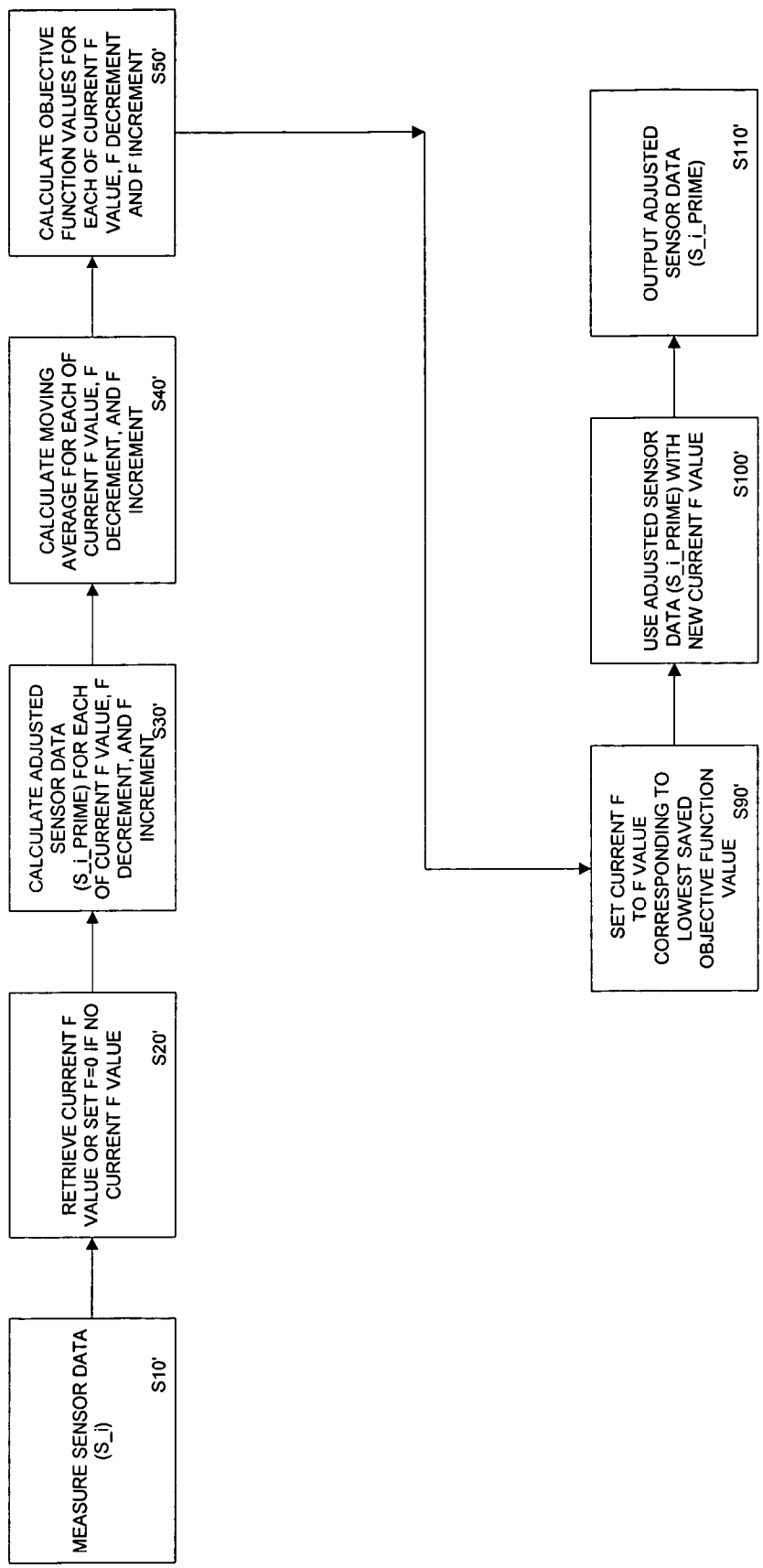
FIG. 11 is a flow chart describing the steps in an iteration in an alternate embodiment of the present invention.

FIG. 11 provides a flow chart describing the steps of an iteration in an alternate embodiment of the present invention. Many of the steps shown in FIG. 11 are similar to those in FIG. 10 and are shown with prime "'" symbol. In addition, FIG. 11 consolidates several of the steps from FIG. 10. Similar to steps S10 and S20 in FIG. 10, sensor data (S_i) is obtained in step S10' and the current F value is retrieved or set in step S20'. Similar to step S30 in FIG. 10, the adjusted sensor data (S_i_prime) is calculated in step S30'. In contrast to step S30, though, the adjusted sensor data is calculated for all (or multiple) values of F in step S30' (e.g., F current value, F decrement, F increment). Similarly in step S40', the moving average of the adjusted sensor data is calculated for each value of F. Next, the objective function values are calculated for each value of F in step S50'. By performing calculations for each value of F simultaneously (often performed concurrently) in each single step, steps S60, S70, an S80 may be eliminated in the embodiment shown in FIG. 11. Therefore, in step S90', the current value of F may be reset based on the results of the multiple, concurrent calculations of the objective function values. Similar to steps S100 and S110, the adjusted sensor data (S_i_prime) with the new current F value is then used as the data output (step S110').

It turns out that in this simple, contrived example, the decrement case gave the ideal (actual scene) solution and a single iteration was all that was required to optimally remove the given fixed pattern. In real situations, noise removal is not usually this simple. The optimal value for F typically changes from frame to frame due to ambient temperature changes (or other drift mechanisms). Moreover, since the scene data is typically changing every frame, all three calculations (F=current value, incremented and decremented) are recalculated for every iteration. The iterations can occur as often as once per frame. Moreover, for an actual two-dimensional IRFPA with multiple rows, the objective function generally is the sum of clipped values for several or all of the rows, not just one.

Although the example illustrated shows the use of three calculations per iteration (i.e., for F=a current value, and incremented value, and a decremented value), one may conceive of schemes that have any number of calculations per iteration greater than or equal to two. (At least two F values should be tried in order to say that one is "better" than the other and to cause a subsequent correction to the current F value when needed.) Although three calculations have been used successfully as shown in the examples, the ability to do more calculations per iteration may be possible and may be limited only by constraints on computing power and speed; higher numbers of calculations per iteration are contemplated and are deemed to be within the scope of the invention.

Furthermore, the size of the incremented and decremented values is not limited to a value of +/-1, and may include non-integer values as well. Similar constraints on computing power and speed may determine which values may be practicable.

For instance, in one embodiment, five different F values are used. In this embodiment F1=Current F Value; F2=Current F Value−1; F3=Current F Value+1; F4=Current F Value+10; F5=Current F Value−10. The use of five F values may improve the speed of convergence on the absolute minimum objective function value. In particular, by having F4 and F5 further from F2 and F3, fewer iterations may be necessary to reach an absolute minimum objective function value that is far from the current F value. In addition, the use of five F values may prevent the calculated minimum objective function value from being stuck in a local minimum that is larger than the absolute minimum.

In one possible embodiment of the invention, the objective function may be determined on a row-by-row (or column-by-column) basis, rather than on a frame-by-frame basis, as shown and discussed. Thus, the ability to calculate an "F" value for individual rows (or columns, rather than frames) may provide for the use of a plurality of optimization steps or iterations within a given frame of data.

In another possible embodiment of the invention, only the portions of a frame with known fixed pattern noise components are processed by the algorithm. For example, if fixed pattern noise exists in an upper portion of a given focal plane array, but there is no fixed pattern noise in a lower portion of the same array, the process of calculating an optimized correction factor ("F" value) would not need to be performed, since equation (1) reduces to S_i_prime=S_i in the absence of fixed pattern noise (i.e., FP_i [no FPN]=0). This may optimize the calculation processing time and may result in reaching an optimized condition more quickly. In a further embodiment of the invention, the iterative process to determine "F" values may begin in an area or areas of a frame that are known to have fixed pattern noise, and moving spatially from those areas to areas with less fixed pattern noise (or none). This embodiment may further reduce the time to reach an optimized condition.

There are several methods for determining the fixed pattern coefficients {FP_i} for a particular artifact or set of artifacts. For example, an image of pixel responsivity for the IRFPA may be the fixed pattern used (e.g., if the temperature of the sensor varies, a fixed pattern artifact that correlates to the array's responsivity can occur). The IRFPA's responsivity "image" is typically determined by subtracting images acquired from two uniform (constant, uniform temperature) scenes of different temperatures. Another possible set of fixed pattern coefficients can be obtained by subtracting two images obtained while looking at the same (possibly uniform) scene, but while the IRFPA and/or camera are at two different temperatures. Yet another possible set of fixed pattern coefficients can be obtained by performing a "two-point" correction (see below) and then simply waiting for the undesired artifact to appear and capturing an image of it while looking at a uniform scene (such as a lens cap). For each of the above techniques to determine the fixed pattern coefficients {FP_i}, the data must be appropriately normalized. That is, the FP_i values need to be normalized such that a pixel having no fixed pattern noise artifact would be zero (assuming equation (1) is being used) and those that have fixed pattern noise would be non-zero. For example, where we used the IRFPA's responsivity image, the normalization may comprise subtraction of the average difference between the sets of pixels (e.g., the offset amount due to the different uniform temperatures of the observed scene) from each pixel.

The algorithm has been demonstrated to work well provided the following conditions are met:

(1) The scene data does not correlate too strongly with the expected fixed pattern noise. Luckily, this is statistically very unlikely for a majority of typical fixed pattern artifacts. Higher resolutions sensors help make this even less likely.

(2) The scene has some relatively uniform areas. Luckily, this too happens often, and higher resolution sensors help this as well.

It is clear that many variations of the algorithm can be anticipated. A few are described below:

(1) Various values can be chosen for clipping limits.

(2) The "smoothing" or "moving average" step can be conducted in many different ways. Different numbers of pixels can be averaged. Also, the smoothing can be contained within a row only, within a column only, or it can include "nearest neighbor" pixels that are located adjacently, including diagonally.

(3) The step (increment, decrement) size can be modified. In addition, multiple step sizes can be evaluated simultaneously.

(4) Multiple iterative corrections can be performed simultaneously provided the fixed pattern error tables do not correlate too strongly. If they do correlate, it can still work but the multiple optimizations may counteract or cancel each other and increase the time required to converge to a "good" solution.

(5) It is possible that a linear system could solve for the true error factor, but absolute value and clipping make this difficult; moreover, the computation power required may be prohibitive for real-time processing.

(6) Other mathematical forms could be used, instead of Equation 1. For example, one could consider a multiplicative correction form:

$$S\_i\_prime = S\_i * F * FP\_i \qquad (2)$$

In the example given above of a multiplicative correction, as described by Equation (2), it should be noted that the "baseline" value of "F" would normally be a value of 1 (to indicate a non-deviation condition), whereas in the additive correction earlier described by Equation (1), the baseline value of "F" would normally be 0 (again, to describe a non-deviation condition). In other words, the iterative process herein described searches for deviations in the strength of the fixed pattern noise to find an optimized correction factor (i.e., "F" value) that deviates from "baseline" values of 0 (for the additive correction) and from a value of 1 (for the multiplicative correction). When using equation (2) to calculate S\_i\_prime values, the FP\_i values need to be normalized such that a pixel having no fixed pattern noise artifact would be one (in contrast to a zero value when equation (1) is being used).

The herein described approach uses actual sensor data to correct for fixed pattern artifacts as they happen. This approach allows for improvement in sensor performance. It often enables acceptable performance from IRFPAs with severe fixed pattern artifacts that would otherwise render them unusable (e.g. with two-point correction). This can allow for better production yield and therefore lower per-unit sensor costs.

This approach isn't necessarily limited to infrared sensors. Any frame-based sampling system with a statistically large enough number of samples (pixels) per frame and an uncontrolled but fixed artifact each frame can benefit from this approach. Visible light and other wavelength sensors may all benefit from this approach.

While the present invention has been particularly shown and described with reference to the accompanying figures, it will be understood, however, that other modifications thereto are of course possible, all of which are intended to be within the true spirit and scope of the present invention. Various changes in form and detail may be made therein without departing from the true spirit and scope of the invention.

What is claimed is:

1. A method of correcting fixed pattern noise (FPN) in an infrared (IR) imaging camera, comprising:
   receiving at least a portion of a frame of data produced by an array of IR sensors in the camera to produce IR sensor data;
   correcting the IR sensor data using multiple strength levels of predetermined FPN data to produce corrected IR sensor data for each strength level, each strength level being a uniform adjustment of the predetermined FPN data;
   calculating the relative level of FPN in the corrected IR sensor data for each strength level; and
   selecting the strength level that produces reduced levels of FPN remaining in the corrected IR sensor data as the selected strength level to correct IR sensor data.

2. The method of claim 1, further including selecting the corrected IR sensor data at the selected strength level.

3. The method of claim 1, wherein calculating the relative level of FPN includes calculating an objective function for each strength level based on the corrected IR sensor data, each objective function value indicating the relative level of FPN remaining in the corresponding corrected IR sensor data, and selecting the strength level of the predetermined FPN data that produces the lowest objective function level as the selected strength level to correct IR sensor data.

4. The method of claim 3, further including determining spatial averages of the corrected IR sensor for each strength level, the objective function for each strength level being based on the corresponding one of the spatial averages.

5. The method of claim 1, wherein the portion of the frame of data is limited to a portion known to be susceptible to FPN.

6. The method of claim 1, wherein the portion of the frame of data is produced by a row or a column of IR sensors in the array.

7. The method of claim 1, further including performing two-point correction of the IR sensor data.

8. The method of claim 1, further including outputting corrected IR sensor data corrected at the selected strength level towards a display unit or storage unit of the camera.

9. The method of claim 1, wherein the selected strength level of the predetermined FPN data is used to correct the IR sensor data of a subsequent frame of data produced by the array of IR sensors.

10. A method of correcting fixed pattern noise (FPN) in an infrared (IR) imaging camera, comprising:
    receiving at least a portion of a frame of data produced by an array of IR sensors in the camera to produce IR sensor data;
    correcting the IR sensor data using multiple strength levels of predetermined FPN data to produce corrected IR sensor data for each strength level, each strength level being a uniform adjustment of the predetermined FPN data;
    determining spatial averages of the corrected IR sensor data for each strength level;
    calculating an objective function value for each strength level based on the corrected IR sensor data and the spatial average data, each objective function value indicating the relative level of FPN remaining in the corrected IR sensor data; and selecting the strength level of the predetermined FPN data that produces the lowest objective function level as the selected strength level to correct IR sensor data.

11. The method of claim 10, wherein the method is repeated using subsequent frames of data produced by the array of IR sensors, each subsequent frame of data producing IR sensor data, corrected IR sensor data at multiple strength levels, objective function values for each strength level, and a selected strength level that produces the lowest objective function value.

12. The method of claim 11, wherein the multiple strength levels used in each subsequent frame includes the selected strength level from the immediately previous frame.

13. The method of claim 12, wherein the selected strength level produced by subsequent frames of data trends towards an optimal strength level.

14. The method of claim 10, wherein the correction of the IR sensor data includes adding a corresponding one of the multiple strength levels of predetermined FPN data to the IR sensor data for each strength level.

15. The method of claim 10, wherein the spatial average calculation includes subjecting the corrected IR sensor data to a smoothing function.

16. The method of claim 10, wherein the spatial average calculation includes calculating average signal levels produced by groups of adjacent IR sensors in the array.

17. The method of claim 16, wherein the groups of adjacent IR sensors include a portion of a row, a portion of a column, or a block of IR sensors.

18. The method of claim 10, wherein the selected strength level of the predetermined FPN data is used to correct the IR sensor data from the portion of the frame of data.

19. The method of claim 10, wherein the selected strength level of the predetermined FPN data is used to correct the IR sensor data from a second portion of the frame of data produced by the array of IR sensors.

20. The method of claim 10, further including performing two-point correction of the IR sensor data.

21. A method of correcting fixed pattern noise (FPN) in an infrared (IR) imaging camera, comprising:

receiving at least a portion of a first frame of data produced by an array of IR sensors in the camera to produce IR sensor data;

correcting the IR sensor data using at least three strength levels of predetermined FPN data to produce corrected IR sensor data for each strength level, each strength level being a uniform adjustment of the predetermined FPN data;

calculating an objective function value for each strength level based on the corrected IR sensor data, each objective function value indicating the relative level of FPN remaining in the corrected IR sensor data; and selecting the strength level of the predetermined FPN data that produces the lowest objective function level as the selected strength level to correct IR sensor data; and using the selected strength level as the intermediate level of the three strength levels for FPN correction of a second frame of data received subsequent to receiving the first frame of data.

22. The method of claim 21, further comprising determining spatial averages of the corrected IR sensor data for each strength level.

23. The method of claim 22, wherein the objective function calculation for each strength level is based on the corresponding spatial average data.

24. The method of claim 23, wherein the objective function calculation includes subtraction of corrected IR sensor data from the spatial average for each strength level to produce difference data.

25. The method of claim 24, wherein the objective function calculation includes calculation of the absolute value of the difference data to produce absolute value data for each strength level.

26. The method of claim 25, wherein the objective function calculation includes clipping the absolute value data at a predetermined maximum value to produce clipped data for each strength level.

27. The method of claim 26, wherein the objective function calculation includes summing the clipped data corresponding to each strength level to total the objective function value for each strength level.

28. A method of correcting fixed pattern noise (FPN) in an infrared (IR) imaging camera, comprising:

receiving at least a portion of sequentially produced frames of data from an array of IR sensors in the camera to produce IR sensor data for each frame;

correcting the IR sensor data within each frame using multiple strength levels of predetermined FPN data to produce corrected IR sensor data for each strength level, each strength level being a uniform adjustment of the predetermined FPN data;

calculating an objective function value for each strength level within each frame based on the corrected IR sensor data, each objective function value indicating the relative level of FPN remaining in the corrected IR sensor data; and selecting the strength level for each frame that produces the lowest objective function level as the selected strength level to correct IR sensor data, one of the multiple strength levels of each frame being the selected strength level from a previous frame.

29. The method of claim 28, wherein the array of sensors includes a focal plane array of microbolometers.

30. The method of claim 28, wherein the strength levels correspond to different multiples of predetermined FPN coefficients.

* * * * *